United States Patent [19]

Carver

[11] 4,357,073
[45] * Nov. 2, 1982

[54] COLLAPSIBLE STEREOSCOPIC VIEWER AND FILMSTRIP HOLDER THEREFOR

[75] Inventor: Robert G. Carver, Ashland, Ohio

[73] Assignee: Creative Cartons of Ashland, Inc., Ashland, Ohio

[*] Notice: The portion of the term of this patent subsequent to Jan. 6, 1998, has been disclaimed.

[21] Appl. No.: 172,062

[22] Filed: Jul. 24, 1980

[51] Int. Cl.³ .............................................. G02B 27/22
[52] U.S. Cl. ..................................... 350/140; 352/239
[58] Field of Search .................. 352/239; 40/159, 160, 40/365; 350/140

[56] References Cited

U.S. PATENT DOCUMENTS

| | | | |
|---|---|---|---|
| 2,789,460 | 4/1957 | Kaufman | 350/140 |
| 2,834,136 | 5/1958 | Kiehl et al. | 40/159 |
| 2,934,999 | 5/1960 | Baumel | 350/140 |
| 3,389,485 | 6/1968 | Roubal | 40/159 |
| 3,582,182 | 6/1971 | Martin | 350/140 |
| 4,152,048 | 5/1979 | Jenner | 350/140 |
| 4,242,818 | 1/1981 | Carver | 40/365 X |

*Primary Examiner*—John K. Corbin
*Assistant Examiner*—Scott J. Sugarman
*Attorney, Agent, or Firm*—Squire, Sanders & Dempsey

[57] ABSTRACT

A collapsible stereoscopic slide viewer is comprised of top, bottom and side walls, a rear wall with viewing apertures therein, a front wall having a pair of light-admitting apertures therein and a lateral filmstrip-receiving channel formed outwardly proximate thereto, the side, rear and front walls being formed from a continuous lateral array; the viewer having offset viewing and light-admitting apertures permitting alternative viewing of two lateral series of stereographic slides disposed on a single filmstrip. A filmstrip holder for retaining laterally disposed stereographic images for use with the viewer is also disclosed. Blanks suitable for assembling the viewer and filmstrip holder are similarly described.

24 Claims, 10 Drawing Figures

COLLAPSIBLE STEREOSCOPIC VIEWER AND FILMSTRIP HOLDER THEREFOR

CROSS REFERENCE TO RELATED PATENTS AND PATENT APPLICATIONS

The present invention is related to U.S. Pat. No. 4,175,828 and U.S. applications Ser. No. 964,474, filed Nov. 29, 1978, now U.S. Pat. No. 4,242,818, Ser. No. 37,466, filed May 9, 1979 and Ser. No. 51,865, filed June 25, 1979, now U.S. Pat. No. 4,253,732, all of the present inventor, which disclose and claim stereoscopic slide viewers, filmstrip holders, and blanks therefor; said patents and applications are incorporated by reference herein and relied upon.

BACKGROUND OF THE INVENTION

The present invention relates to stereoscopic photographic slide viewers and filmstrip holders therefor. More particularly, the present invention relates to disposable, collapsible stereoscopic photographic slide viewers and disposable filmstrip holders therefor.

Various types of photographic slide viewers are known in the art, including stereoscopic slide viewers, which may be folded or collapsed. Conventionally, slide viewers include a front wall having a light-admitting opening for illuminating a photographic slide, and a rear wall having a viewing aperture which routinely houses a magnification lens. Collapsible viewers are similarly well known, certain designs being adapted for disposable use by virtue of construction from cardboard or like materials. Routinely, some means for insuring cooperation between an inserted filmstrip or filmstrips, which may be disposed in a holder, and the viewer itself are provided, often in the form of a filmstrip receiving channel adjacent to the front wall of the viewer. Light diffusing elements are conventionally incorporating into the light-admitting opening. Examples of these optical viewers and filmstrip holders are those disclosed in U.S. Pat. Nos. 2,543,240, 2,768,554, 2,789,460, 2,933,015, 2,934,999, 2,986,830, 3,019,691, 3,386,194, 3,553,866 and 3,562,939.

While each of the cited patents discloses a viewer suitable for its intended purpose, various of them require elaborate assembly of a foldable blank to yield a finished viewer. Most of the disclosed viewers involve a blank that folds about an axis generally perpendicular to the side walls of the viewer. Such a folding axis results in a relatively complex structure and complex assembly steps for folding and closure of the side walls. Conversely, those of the viewers disclosed in the patents cited above which are of simpler design fail to yield a finished article which possesses sufficient structural integrity to withstand extended use. Yet other designs require the attachment of an independent film-receiving channel to a completed optical viewer.

The filmstrip elements for retaining and positioning the photographic slides for observation disclosed in the cited patents also suffer design deficiencies. In stereoscopic slide systems where two separate slides are used to form the stereographic pair, providing accurate registration between the two photographic slides in order to obtain the stereoscopic effect is particularly troublesome. One conventional approach to solving the registration problem employs a filmstrip holder blank having a pair of longitudinal slots formed therein to receive the photographic filmstrips. In some of these holders, the filmstrips are placed on the blank coincident with the longitudinal slots and the assembly is folded and joined together. In other holders, the filmstrips are inserted after the holder is assembled. While these filmstrip holders are quite simple, none fully solves the problem of registering pairs of stereographic images.

Consequently, the need exists to provide a collapsible, preferably disposable, stereoscopic optical viewer which is of simple physical design, is easily assembled from a blank, and which (although disposable) possesses sufficient structural integrity to allow for extended use. Similarly, the need exists to provide a cooperative filmstrip holder for this stereoscopic viewer which accurately secures and positions stereographic pairs of photographic slides in proper registration for stereoscopic viewing.

SUMMARY OF THE INVENTION

It is therefore, a primary object of the present invention, to provide a stereoscopic optical viewer which is of simplified construction.

Another object of the present is to provide a collapsible, disposable stereoscopic optical viewer which possesses sufficient structural integrity to withstand extensive use.

Another object of the present invention is to provide a blank from which an optical viewer of the aforementioned character may be simply assembled.

Still another object of the present invention is to provide a stereographic filmstrip holder of improved design which eliminates the need to register two separate filmstrips of stereographic images and which positively and accurately positions and secures stereographic filmstrips in order that the same be viewed in a stereoscopic mode.

Yet another object of the present invention is to provide a filmstrip holder comparable to the collapsed viewer in area, while providing a relatively large number of selectable views.

It is a further object of the present invention to provide a filmstrip holder and viewer that will permit alternative viewing of one of two series of stereographic images.

It is yet another object of the present invention to provide a blank from which a filmstrip holder of the aforementioned character may be simply assembled.

It has now been determined that the foregoing objects may be realized, in accordance with the present invention, by providing a collapsible stereoscopic slide viewer comprising a front wall having a pair of light-admitting apertures therein; a rear wall assembly formed from two panels, each panel having a pair of viewing apertures therein, the optical axes of which are coincident with the optical axes of the light-admitting openings in the front wall; magnification lenses in the viewing apertures; two substantially identical side walls, the rear wall panels, side walls and front wall being formed as a continuous lateral array; substantially identical top and bottom walls; and, an integral filmstrip holder-receiving channel outwardly proximate the front wall, which channel is formed from an extension of either the top or the bottom wall of the viewer. The rear wall assembly, preferably, comprises two panels that are multiply adhered with each other in such a manner that a pair of transverse pockets for receiving the magnification lenses are formed.

Assembly of the optical viewer of the present invention from the blank is materially simplified by virtue of the design of the latter, whereby gluing, sealing or closing operations are minimized while structural integrity is maximized.

An improved filmstrip holder in accordance with the present invention is provided by a holder comprising a cover wall having an appropriate lateral viewing slot therein; a base wall having a lateral viewing slot and a transverse access slit therein; and a spacing wall interposed between the base and cover walls having a lateral film retaining slot therein. A stereographic filmstrip is inserted in the holder through the access slit and is held within the retaining slot.

Stereographic pairs of images are disposed laterally on a filmstrip in registration with the light-admitting apertures of the viewer in order that different stereographic views may be formed by the combination of the viewer and holder containing the filmstrip. Different views are selected by drawing the holder laterally through the channel in the viewer. By appropriate location of the viewing apertures in the viewer and of the viewing slots in the holder, the viewer may be used in combination with a filmstrip containing two transversely disposed series of laterally spaced stereographic pairs of images to view, stereoscopically and alternatively, one or the other of the series of images.

Further objects and advantages of the present invention will become apparent to the skilled artisan upon examination of the detailed description of the invention, taken in conjunction with the figures of drawings.

DESCRIPTION OF PREFERRED EMBODIMENTS

In order to more fully explain the various objects and advantages of the present invention, the same will now be described with reference to certain preferred embodiments thereof. However, the skilled artisan will appreciate that such a description of preferred embodiments is intended to be illustrative only, and is not to be deemed limiting.

Figure 1:
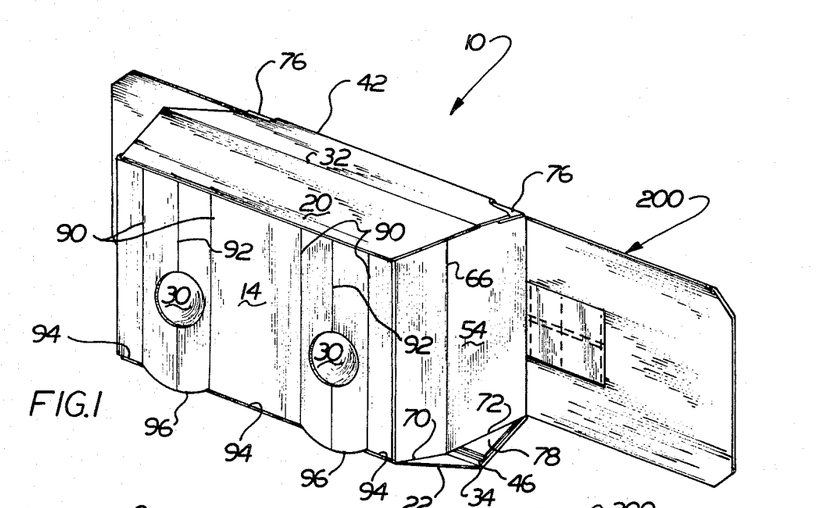
FIG. 1 is an isometric view of the optical viewer of the present invention and associated filmstrip holder.

A preferred embodiment of a collapsible, stereoscopic viewer of the present invention is illustrated in FIG. 1 and is comprised of a viewer body 10 and associated filmstrip holder 200. For ease of description of the various elements comprising the viewer body 10, as well as a better appreciation of the cooperative nature of the same, reference is made to FIG. 9 which illustrates a blank 10' from which the viewer body is assembled.

Figures 9, 10:
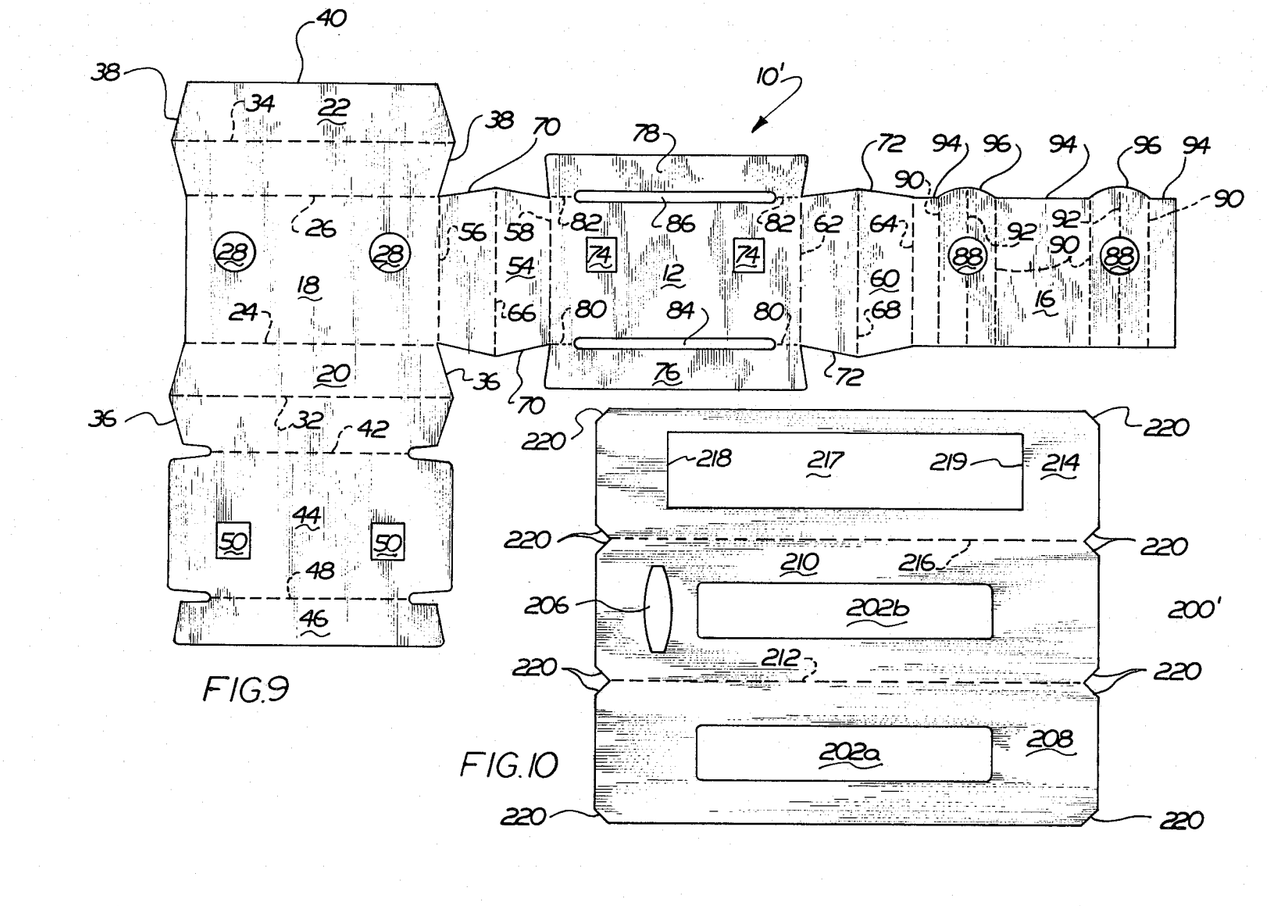
FIG. 9 is a top plan view of a blank from which an optical viewer of the present invention may be assembled.
FIG. 10 is a top plan view of a blank from which a filmstrip holder of the present invention may be assembled.

The viewer body 10 is comprised of a front wall 12 and a rear wall assembly, designated generally 14, assembly 14 including a rear panel 16 and rear reinforcing panel 18.

A top wall 20 and a bottom wall 22, which are substantially identical, are provided contiguously to opposing lateral margins of rear reinforcing panel 18 along lateral fold lines 24 and 26, respectively. For ease of description, all lines parallel to the lateral fold lines 24 or 26 will be referred to herein as "lateral", while all lines perpendicular thereto will be described as "transverse", regardless of actual orientation. In a like manner, the face of the blank shown in FIG. 9 will be referred to herein as the "top" while the opposed face will be described as "obverse". One or both of top and bottom walls 20 and 22 may alternately be contiguous to rear panel 16 within the spirit of the invention, providing appropriate changes are made in the adhesive striping and assembly operations described hereinafter.

Figure 6:
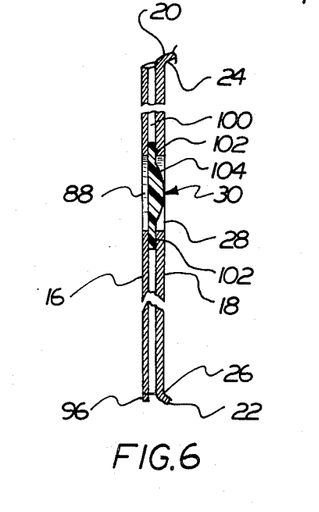
FIG. 6 is a fragmentary, sectional view of one viewing aperture and associated lens of the optical viewer of the present invention taken substantially along line 6—6 of FIG. 1.

Rear reinforcing panel 18 has a pair of viewing apertures 28 in which are disposed a pair of magnification lenses 30, as best viewed in FIG. 6. In a preferred embodiment, rear reinforcing panel 18 is adapted to receive three transverse adhesive stripes on the obverse face of the blank shown in FIG. 9, one stripe between each transverse margin of panel 18 and aperture 28 and one stripe substantially centered on panel 18. Although it is preferred that adhesive, and, where necessary, flaps, be used to assemble the viewer other methods of assembly may be used. For example, tabs and corresponding tab-receiving slits may be used to assemble the viewer, particularly if the ultimate user is to perform the assembly.

In the preferred embodiment shown in the figures of drawing, both the top and bottom walls, 20 and 22, include a medial lateral fold line, 32 and 34 respectively. The marginal, generally transverse edges of the top and bottom walls, 36 and 38 respectively, project outwardly to a slight degree, as best viewed in FIG. 9, to provide peaks in the assembled viewer, as best viewed in FIGS. 1, 3 and 4. Each peak is bisected at its apex by one of lateral fold lines, 32 or 34. These peaks serve as convenient places to hold the assembled viewer between thumb and forefinger while viewing slides.

In a preferred embodiment, bottom wall 22 is adapted to receive, on the top face of the blank shown in FIG. 9, a lateral adhesive stripe between its transverse edge 40 and the medial fold line 34. Top wall 20 is adapted to receive, on the top face, a lateral adhesive stripe between fold line 32 and opposing a transverse fold line 42 along the margin of top 20.

Figure 7:
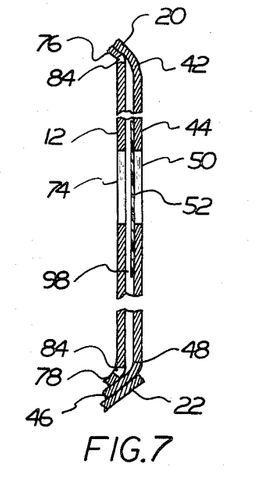
FIG. 7 is a fragmentary, sectional view of one light-admitting aperture taken substantially along line 7—7 of FIG. 1.

As shown in the figures of drawing, a channel wall 44 is contiguous with top wall 20 along lateral fold line 42 and, preferably, with a flap 46 along lateral fold line 48. Channel wall 44 contains a pair of light-admitting apertures 50 for alignment in the assembled viewer with the optical axes of viewing apertures 28. Light-admitting apertures 50 have light diffusing elements 52 therein or thereover, as best viewed in FIG. 7. In a preferred embodiment, flap 46 is adapted to receive lateral stripes of adhesive on both faces. Alternately, because of the substantial identity of top wall 20 and bottom wall 22, channel wall 44 could as well be contiguous with bottom wall 22 along edge 40 without departing from the spirit of the invention. That is, the designations top and bottom as used in this specification and the appended claims have no directional connotations and the members so referenced may be interchanged with appropriate changes in the assembly procedure.

A first side wall 54 is contiguous with rear reinforcing panel 18 and front wall 12 along transverse fold lines 56 and 58, respectively. A second side wall 60 is contiguous with front wall 12 and rear panel 16 along transverse fold lines 62 and 64, respectively. Both the first and second side walls have a medial transverse fold line, 66 and 68, respectively. In the same way the top and bottom walls are provided with peaked edges as described above, the marginal, generally lateral edges of the side walls 54 and 60, 70 and 72 respectively, project outwardly somewhat to form peaks where the apex of each is bisected by one of the medial fold lines. When the viewer 10 is assembled, as best viewed in FIGS. 1 and 4, the peaks on the side walls serve as focus stop means as described more fully hereinbelow. These peaks also exclude as much extraneous light as possible without interference with focusing.

Front wall 12 has a pair of light-admitting apertures 74 corresponding to and in alignment with the optical axes of viewing apertures 28. In a preferred embodiment, lateral flaps 76 and 78 are contiguous to front wall 12 along lateral fold lines 80 and 82, respectively. Fold lines 80 and 82 are preferably discontinuous with slots 84 and 86, respectively, connecting the discontinuous segments. Slots 84 and 86 permit easier folding of flaps 76 and 78 during assembly of the viewer and aid flex-focusing of the viewer. Flaps 76 and 78 are adapted to receive longitudinal stripes of adhesive on the obverse face of the blank shown in FIG. 9.

Rear panel 16 contains a pair of viewing apertures 88 and preferably has a pair of transverse indented lines 90 substantially symmetrically located about each viewing aperture 88 and a transverse indented line 92 substantially bisecting each aperture 88. A lateral edge 94 of rear panel 16 is preferably discontinuous, having a pair of discontinuous portions consisting of outwardly projecting arcuate segments 96, one such segment being aligned with each viewing aperture 88 and its associated fold lines 92. In a preferred embodiment, rear panel 16 is adapted to receive three transverse adhesive stripes on the top face of the blank, one stripe between each transverse margin of the rear wall and the indented line 90 nearest thereto and one stripe substantially centered on rear panel 16 for attachment with the adhesive stripes on reinforcing panel 18.

It is an important advantage of the present invention that rear wall panels 16 and 18, side walls 54 and 60 and front wall 12 form a continuous lateral array of panels. That is, in the blank from which the viewer is assembled, those panels are formed from a unitary, continuous piece of material, the panels being laterally defined by transverse fold lines. In assembly, one free transverse edge of the array is connected to another appropriate part of the array, so that in the assembled viewer, the rear panels, side walls and front wall are laterally continuous, being interrupted only by a closure means such as a glue joint or joints or the equivalent thereof. In the embodiment of FIG. 9, rear panel 16 and the rear reinforcing panel 18 are at opposite ends of the lateral array and are joined in assembly by multiple adhesive stripes. This lateral layout minimizes the number of joints and flaps or other closure means needed for viewer assembly and consequently simplifies the assembly process. The panels in the lateral array having free transverse edges need not be panels 16 and 18, nor must either or both of the top and bottom walls 20 and 22 be contiguous to rear reinforcing panel 18 to achieve some of the assembly-simplification advantage, but the illustrated embodiment is preferred to obtain it.

Assembly of the viewer body 10 from the blank 10', shown in FIG. 9 or from variations of the blank within the spirit of the invention is very simply achieved. The blank 10', most preferably formed from a paperboard material is easily die stamped to the shape shown in FIG. 9 and all of the fold lines and indented lines are placed therein simultaneously. Preferably, each of the linear and arcuate edges and fold and indented lines may be cut, indented or embossed from a single side; that is, each of the fold lines in FIG. 9 preferably projects out of the surface of the page, whereby outwardly directed fold lines in the assembled viewer result. Once the blank 10' is cut to the configuration shown in FIG. 9, and the fold lines are formed thereon, light diffusing element 52, preferably a thin film of a standard light diffuser (e.g., acetate) or similar translucent material is attached to the top side of channel wall 44. Preferably, adhesive is applied to top and bottom walls, 20, 22 rear panel 16, rear reinforcing panel 18 and flaps 46, 76 and 78 on the portions and faces hereinabove described as adapted to receive the adhesive.

The blank is then folded 180 degrees about each of side wall medial fold lines 66 and 68 so that the top side of rear wall 16 as shown in FIG. 9 is in face-to-face contact with the obverse face of rear reinforcing panel 18. Panels 16 and 18 are adhered together with the previously applied adhesive to form rear wall assembly 14. Next, channel wall 44 and the contiguous half of top wall 20 are folded 180 degrees about top wall 20 and medial fold line 32 so that the top face of channel wall 44 is in contact with the obverse face of front wall 12. Flap 76 is adhered to the portion of top wall 20 between fold line 32 and 42 and flap 78 is adhered to flap 46 with the previously applied adhesive. Finally, the portion of bottom wall 22 between edge 40 and medial fold line 34 is rotated about medial fold line 30 to contact the obverse face of flap 46 and is adhered to it with the previously applied adhesive.

When the adhesive has joined the adhered portions together, the viewer is opened by simultaneously compressing medial fold lines 32 and 34. The top and bottom walls of the assembled viewer are then pitched outward. The side walls 54 and 60 are caused to the pitched inward, as shown in FIGS. 1, 3, 4 and 5, by pressing inward on the side walls until medial fold lines 66 and 68 adopt a reverse fold. Inward pitch of the side walls is advantageous in reducing the amount of extraneous light entering the interior of the viewer. The pitched walls of the assembled viewer provide a focusing feature as described hereinbelow. The assembled viewer forms a lateral channel 98 between front wall 12 and channel wall 44, best seen in FIG. 7, for receiving filmstrip holder 200. Magnifying lenses 30 are inserted in rear wall assembly 14 through a pair of pockets 100 formed between rear panel 16 and rear reinforcing panel 18 by the transverse adhesive stripes joining those panels. Arcuate portions 96 aid in gaining access to the pockets and indented lines 90 and 92 aid in expanding the pockets slightly to allow insertion of the lenses 30. The lenses are preferably plano-convex lenses with a generally flat peripheral annular flange 102 surrounding a convex portion 104 to aid the retention of the lenses within apertures 28 and 88 in rear wall assembly 14. One lens is urged into each pocket 100 until it is seated with convex portion 104 protruding within aperture 28 as shown in FIG. 6.

Figure 2:
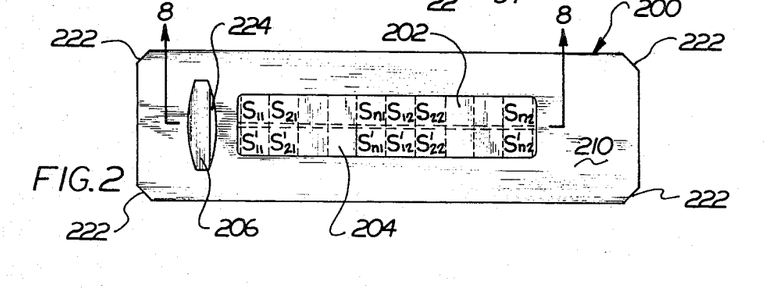
FIG. 2 is a top plan view of a filmstrip holder of the present invention.
Figure 3:
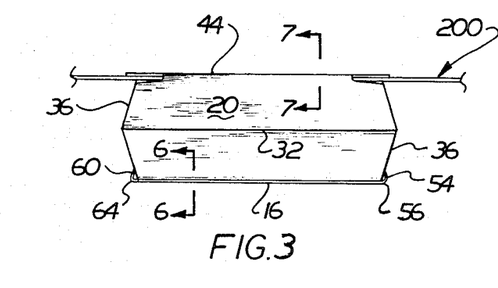
FIG. 3 is a top plan view of an optical viewer and filmstrip holder of the present invention.
Figure 4:
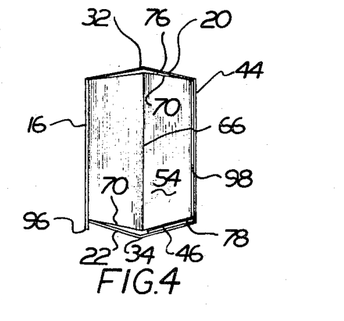
FIG. 4 is a side elevational view of an optical viewer of the present invention.
Figure 5:
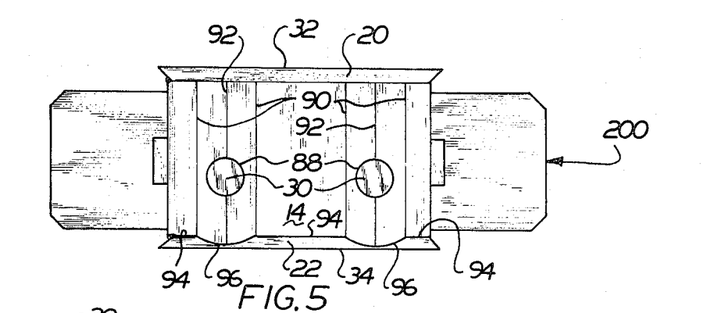
FIG. 5 is a rear elevation view of an optical viewer, and filmstrip holder, of the present invention.
Figure 8:
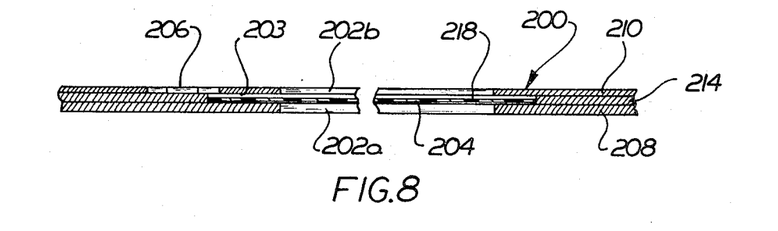
FIG. 8 is a fragmentary, sectional view of a filmstrip holder of the present invention taken substantially along line 8—8 of FIG. 2.

A preferred embodiment of a filmstrip holder of the present invention for use in conjunction with the stereoscopic viewer described above is shown in combination with the viewer 10 in FIGS. 1, 3 and 5 and separately in FIG. 2. Filmstrip holder 200 includes a viewing slot 202, a peripheral pocket 203, best shown in FIG. 8, for receiving a translucent stereographic filmstrip 204 through slit 206, and for positioning it in slot 202. Filmstrip 204 preferably consists of two series of stereographic pairs of framed images, $S_{11}, S_{21} \ldots S_{n1}; S_{12}, S_{22} \ldots S_{n2}$ and $S'_{11}, S'_{21} \ldots S'_{n1}; S'_{12}, S'_{22} \ldots S'_{n2}$ as shown in FIG. 1, $S_{11}$ and $S_{12}$, $S_{21}$ and $S_{22}$, $S'_{11}$ and $S'_{12}$, $S'_{21}$ and $S'_{12}$, and so forth, constituting stereographic pairs of images. Each series may be alternatively viewed with viewer 10 as described hereinbelow. Filmstrip 204 may also consist of a single series of stereographic pairs of images.

For a proper understanding of the manner of construction of film holder 200, as well as the cooperation of the various elements comprising the holder, reference is made to FIG. 10 which illustrates a blank 200' from which the holder is assembled.

Blank 200' is comprised of a cover wall 208 having a viewing slot 202a therein. Cover wall 208 is contiguous with a base wall 210 along a lateral score line 212. Following the convention used with viewer blank 10', all lines parallel to score line 212 will be designated lateral and all lines perpendicular to it will be designated transverse regardless of actual orientation, and the face shown in FIG. 10 will be referred to as the top face. Base wall 210 has a lateral viewing slot 202b formed in it for registration with slot 202a to form slot 202 in the assembled holder 200. Slots 202a and 202b have a transverse dimension slightly larger than the total transverse dimension of the frame or frames of the single or dual series of steregraphic images (the dual series being depicted in FIG. 2) plus any transverse separation of the series, but less than the width of filmstrip 204. Slots 202a and 202b have a lateral dimension slightly larger than the total lateral dimension of framed series of paired stereographic images, e.g. $S_{11}$ through $S_{n2}$ of FIG. 2. The slots thus permit full illumination of all of the framed images. Base wall 210 also has formed in it a transverse slit 206 of a transverse dimension slightly greater than the width of filmstrip 204, the slit being substantially symmetrically placed with respect to the lateral axis of slot 202b.

A spacing wall 214 is contiguous to a base wall 210 along a lateral score line 216. Spacing wall 214 has a retaining slot 217 formed in it having transverse edges 218 and 219. The transverse dimension of retaining slot 217 is slightly greater than the width of filmstrip 204. The lateral dimension of slot 217 is slightly greater than the overall length of filmstrip 204. Retaining slot 217 is formed in spacing wall 214 so as to overlap, in the assembled holder, both slot 202 and the full transverse dimension of slit 206 in order that slit 206 may provide access to retaining slot 217.

The corners of each of walls 208, 210 and 214 are diagonally cut to form angled segments 220 so that angled corners 222 are formed on the assembled filmstrip holder 200. Each of walls 208, 210 and 214 is adapted to receive a peripheral stripe of adhesive on its top face, and spacing wall 214 is also adapted to receive a peripheral stripe of adhesive on its obverse face.

Assembly of the filmstrip holder 200 from the blank 200' of FIG. 10 is very simply achieved. The blank 200', most preferably formed from a paperboard material, is easily die stamped to the shape shown in FIG. 10, and all of the score lines are placed therein simultaneously. Preferably, each of the edges and score lines may be cut from a single side, each of the score lines of FIG. 10 being cut on the obverse face of the blank 200' of FIG. 10. Once the blank 200' of FIG. 10 is cut and the score lines cut into it, adhesive is applied to the areas adapted to receive it as described hereinabove. Spacing wall 214 is folded 180 degrees about score line 216 to be in face-to-face relationship with top face of base wall 210. Cover wall 208 is then folded 180 degrees about score line 212 to be in face-to-face relationship to the obverse face of spacing wall 214. Assembly is completed when walls 208, 210 and 214 have adhered as described.

When the faces of walls 208, 210 and 214 are adhered to each other, a filmstrip 204 may be inserted into the pocket 203, formed by slots 202a, 202b and 217, through slit 206. Because of the relationships of the dimensions of the filmstrip and retaining slot 217, the insertion of a filmstrip 204 is stopped by edge 219 of retaining slot 217. Edge 218 of slot 217 likewise acts to lock filmstrip 204 in place with the framed images appearing in viewing slot 202.

The transverse dimension of the assembled holder is slightly less than that of channel 98 in viewer 10 so that the holder may be slidably inserted into the channel and the relative position of the holder with respect to the viewer may be slidably adjusted. The angled corners 222 of holder 200 aid the insertion of holder 200 into channel 98.

The dimensions of the light-admitting apertures 50 and 74 of viewer 10 define the field view and the dimensions of the image frames, e.g. $S_{11}$, of filmstrip 204 are chosen so that one frame fills a light-admitting aperture for viewing. The lateral separation of a pair of stereographic images on filmstrip 204 and of light-admitting apertures 50 and 74 in viewer 10 is substantially identical so that a pair of stereographic, framed images on filmstrip 204 in holder 200 may be brought into lateral registration with the apertures to achieve stereoscopic viewing by the adjustment of holder 200 within channel 98 of viewer 10. Use of a single filmstrip with stereographic pairs of images permanently fixed thereon in registration with the viewing apertures eliminates the difficulty of achieving and maintaining registration between the paired images experienced where each of the images is disposed on a separate filmstrip.

In addition to lateral registration of the apertures of viewer 10 and the frames of filmstrip 204, when the holder 200 is inserted into channel 98, the frames and apertures must be in transverse registration to achieve stereoscopic viewing. Transverse registration may be achieved by similarly disposing apertures 74 on front wall 12 and a single series of stereographic framed images within holder 200. Preferably, apertures 74 lie substantially entirely on one side of a lateral medial line on front wall 12. By similarly offsetting a series of framed stereographic images on filmstrip 204, a dual series of images can be accomodated on the filmstrip as shown in FIG. 2. In this configuration, the narrow lateral boundary between the two series of framed images is medially disposed in holder 200. When holder 200 is inserted into channel 98, the stereoscopic pairs of one series of images may be viewed with viewer 10; the holder may then be withdrawn, rotated about its lateral axis 180 degrees and reinserted into channel 98 to permit stereoscopic viewing of the stereographic pairs in the second series of images. This configuration permits the use of holder of only slightly greater area than channel wall 44 yet accomodating a relatively large number of slide pairs. For example, with square framed images about 12 mm. on a side, a holder with a lateral viewing aperture 24 mm. by 120 mm. can accomodate ten stereoscopic views with a channel wall having an area of about 70 sq. cm. and holder having an area of about 86 sq. cm.

For ease of transportation and/or marketing, the viewer 10 and filmstrip holder 200 can conveniently be packaged in the form of blanks 10' and 200'; they might even be pre-assembled since they are of generally planar configuration in both conditions inasmuch as the viewer is collapsible. If an alternate closure method is not used, the various areas of the blanks adapted to receive a quantity of adhesive might, optionally, be pre-pasted with a pressure-sensitive adhesive provided with a suitable protective covering for shipping in the form of blanks.

Further, it is preferable to package the blank 10' with the light diffusing elements 52 adhered thereto. However, magnification lenses 30 may remain loosely packaged for the ultimate insertion in the viewing apertures in rear wall assembly 14 via transverse pockets 100 by the user upon assembly of the viewer, lenses 30 being firmly retained in place by virtue of flanges 102.

Regardless of the manner in which the viewer and holder are packaged, once they are assembled and a filmstrip inserted in a holder, the user may easily insert a filmstrip holder 200 into channel 98 in viewer 10 in order to view pairs of framed stereographic images, e.g. $S_{11}$ and $S_{12}$. When the viewer is directed toward a source of light, diffuser elements 52 provide generally uniform illumination of the selected images, while magnification lenses 30 resolve the images. Focusing the viewer is simply achieved by applying a compressive force on medial transverse fold lines 32 and 34, whereby the distance between the front wall 12 and rear wall assembly 14 is altered. Selection of images to be viewed may be simply made by choosing the desired orientation of holder 200 and adjusting it laterally to place the images in registration with the optical axes of viewer 10.

The natural resiliency of the paperboard or other material from which the viewer is made coupled with the pitched arrangement of walls described above will typically cause the front and rear walls to be spaced too closely for optimum focus. Pinching the peaks or tabs on the top and bottom walls moves the front and rear walls apart until proper focus is achieved. The peaks or tabs on the side walls are appropriately dimensioned to permit separation of front and rear walls by a distance somewhat greater than necessary for proper focus and to stop (i.e. prevent movement by interference with top and bottom walls) further relative displacement of the front and rear walls, thus serving as focus stop means. The exact dimensions of the focus stop peaks admits of no fixed parameters, since the configuration of the viewer may vary. But, guided by the principles set forth herein, the skilled artisan will be able to design an effective focus stop with no difficulty.

The viewer and filmstrip holder possess sufficient structural integrity to allow for extensive use, notwithstanding the fact that the same may be fabricated from paperboard or the like should it be designed for disposable use. Obviously, for more permanent applications, the viewer and associated filmstrip holder might be made from a light-weight plastic. The continuous lateral arrangement of the sides, rear and front of the viewer simplifies its assembly from a blank. The filmstrip holder eliminates the need to register and maintain in registration two separate filmstrips each containing one of a pair of stereographic images. The viewer and holder further permit the alternative viewing of one of two series of stereographic pairs of images and the packaging of a relatively large number of views in a relatively small area.

While the invention has now been described with reference to certain preferred embodiments, the skilled artisan will recognize the various substitutions, changes, modifications and omissions may be made without departing from the spirit thereof. Accordingly, it is intended that the scope of the invention be limited solely by the following claims.

I claim:
1. A collapsible stereoscopic optical device comprising:
   (a) a front wall having a first pair of light-admitting apertures therethrough;
   (b) a rear wall assembly having first and second panels, said assembly having a pair of viewing apertures therethrough in optical registration with said light-admitting apertures;
   (c) first and second side walls wherein said front and side walls and said rear wall assembly panels are formed from a continuous lateral array of material;
   (d) top and bottom walls; and
   (e) a channel wall outwardly proximate said front wall having a second pair of light-admitting apertures therethrough in optical registration with said first pair of light-admitting apertures;
   wherein said channel wall and said front wall form a lateral filmstrip-receiving channel.

2. The device of claim 1, including a pair of magnification lenses, one lens being disposed in each of said viewing apertures.

3. The viewer of claim 2 wherein said first and second side walls and said top and bottom walls comprise focus means for focusing said viewer.

4. The viewer of claim 3, wherein the focusing means comprises:
   (a) a lateral, medial fold line on each of said top and bottom walls, and
   (b) a transverse medial fold line on each of said first and second side walls,
   whereby a compressive force applied to said top and bottom walls of said viewer effects a relative displacement between said front wall and said rear wall assembly.

5. The viewer of claim 4 further including focus stop means for stopping focusing comprising transverse projections on the generally lateral edges of said side walls for contacting said top and bottom walls when compressed to stop further relative displacement of said top and bottom walls.

6. The viewer of claim 2, wherein said first pair of light-admitting apertures lies substantially entirely within one of the portions of said front wall defined by a medial lateral line on said front wall.

7. The device of claim 1 wherein light-diffusing elements are disposed in each of said second pair of light-admitting apertures.

8. The device of claim 1, wherein said rear wall assembly comprises first and second panels, each of said panels containing a pair of viewing apertures therethrough in optical registration with said first pair of light-admitting apertures.

9. The device of claim 8 wherein said first and second panels are multiply transversely attached to each other to define a pair of pockets therebetween, one of said pockets overlapping each of said viewing apertures.

10. The device of claim 9 wherein said rear wall assembly includes access means for access to said pockets.

11. The device of claim 10, wherein said access means comprises two discontinuous portions on a lateral edge of one of said panels, one of said portions being aligned with each of said pockets.

12. The device of claim 10, wherein said access means comprises one of said panels
 (a) two pairs of transverse indentation lines, the members of each of said pairs being spaced substantially symmetrically about one of said viewing apertures, and
 (b) two transverse indentation lines, one of said transverse indentation lines being located substantially centrally with respect to each of said viewing apertures.

13. The device of claim 9, including a pair of magnification lenses, one of said pair of magnification lenses being restrained within each of said pockets.

14. The viewer of claim 13, wherein each of said magnification lenses includes a peripheral annular flange projecting outwardly from said lens into the pocket containing said lens.

15. In a stereoscopic slide viewer having rear, top, bottom and side walls, a front wall having a pair of light-admitting apertures therein, and a lateral filmstrip-receiving channel formed outwardly proximate of said front wall by a channel wall spaced from said front wall, the improvement comprising said apertures lying substantially entirely within one of the portions of said front wall defined by a transverse medial line on said front wall.

16. A blank for forming a collapsible stereoscopic optical device comprising:
 (a) a lateral, continuous array of panels defined by transverse fold lines including
  (i) a first rear wall panel having a first pair of viewing apertures therethrough,
  (ii) a first side wall,
  (iii) a front wall having a pair of light-admitting apertures therethrough for optical registration with said viewing apertures,
  (iv) a second side wall, and
  (v) a second rear wall panel having a second pair of viewing apertures therethrough for optical registration with said first pair of viewing apertures;
 (b) a channel wall having a pair of light-admitting apertures therethrough for optical registration with said light-admitting apertures in said front wall;
 (c) a top wall contiguous to said channel wall along a lateral fold line and contiguous to one of said rear wall panels, along a lateral fold line forming a portion of a first lateral side of said array; and
 (d) a bottom wall contiguous to one of said rear wall panels along a lateral fold line forming a portion of a second lateral side of said array.

17. The blank of claim 16, wherein a lateral side of one of said rear wall panels has a two discontinuous portions, one of said portions being aligned with each of said viewing apertures therethrough.

18. The blank of claim 16, wherein one of said rear wall panels includes two pairs of transverse indentation lines, the members of each of said pairs being spaced substantially symmetrically about one of said viewing apertures, and further includes two transverse indentation lines, one of said transverse indentation lines being located substantially centrally with respect to each of said viewing apertures.

19. The blank of claim 16, wherein said first and second side walls each include a medial transverse fold line and said top and bottom walls each include a medial lateral fold line.

20. The blank of claim 16, wherein said light-admitting apertures in said front wall lie substantially entirely within one of the portions of said front wall defined by a medial lateral line on said front wall.

21. A filmstrip holder for receiving a stereographic filmstrip for stereoscopic viewing, said holder comprising:
 (a) a cover wall having a first lateral viewing slot therethrough;
 (b) a base wall having a second lateral viewing slot therethrough in registration with said first viewing slot;
 (c) a spacing wall disposed between said cover wall and said base wall having a lateral retaining slot therethrough larger than and overlaying said viewing slots, said retaining slot and walls forming a pocket peripheral to said viewing slots; and
access means for access to said pocket, said access means comprising a transverse slit through said base wall proximate said second viewing slot.

22. A blank for forming a stereographic filmstrip holder comprising:
 (a) a cover wall having a first lateral viewing slot therethrough;
 (b) a base wall contiguous to said cover wall along a lateral fold line, said base wall having a second lateral viewing slot therethrough for registration with said first viewing slot and a transverse slit therethrough proximate said second viewing slot for inserting a filmstrip; and
 (c) a spacing wall contiguous to said base wall along a lateral fold line, said spacing wall having a lateral retaining slot therethrough larger than said first or second lateral viewing slot for overlaying alignment therewith.

23. The combination of a collapsible stereoscopic viewer, a filmstrip and a filmstrip holder, said viewer comprising:
 (a) a front wall having a first pair of light-admitting apertures therethrough:
 (b) a rear wall assembly having first and second panels, said assembly having a pair of viewing apertures therethrough in optical registration with said light-admitting apertures;
 (c) a pair of magnification lenses, one lens being disposed in each of said viewing apertures;

(d) first and second side walls wherein said front and side walls and said rear wall assembly panels are formed from a continuous lateral array of material;

(e) top and bottom walls;

(f) a channel wall outwardly proximate said front wall having a second pair of light-admitting apertures therethrough in optical registration with said first pair of light-admitting apertures wherein said channel wall and said front wall form a lateral filmstrip-receiving channel, said filmstrip holder comprising (g) a cover wall having a first lateral viewing slot therethrough;

(h) a base wall having a second lateral viewing slot therethrough in registration with said first viewing slot; and (i) a spacing wall disposed between said cover wall and said base wall having a lateral retaining slot therethrough overlying said viewing slots, said retaining slot and walls forming a pocket peripheral to said viewing slots; and a filmstrip comprising a lateral series of stereographic pairs of translucent framed images said pairs being laterally spaced in registration with said first pair of light-admitting apertures, said framed images being similarly transversely oriented and of substantially the same dimensions as said first pair of light-admitting apertures, said filmstrip being disposed within said retaining slot in said holder so that said framed images are substantially disposed within said viewing slots in said holder, and said holder being adapted for laterally slidable insertion into and withdrawal from said channel, and for substantially transversely aligning said framed images with said first pair of light-admitting apertures when said holder is within said channel.

24. The combination of a collapsible stereoscopic viewer, a filmstrip and a filmstrip holder, said viewer comprising:

(a) a front wall having a first pair of light-admitting apertures therethrough, said apertures lying substantially entirely within one of the portions of said front wall defined by a medial lateral line on said front wall;

(b) a rear wall assembly having first and second panels, said assembly having a pair of viewing apertures therethrough in optical registration with said light-admitting apertures;

(c) a pair of magnification lenses, one lens being disposed in each of said viewing apertures;

(d) first and second side wall wherein said front and side walls and said rear wall assembly panels are formed from a continuous lateral array of material;

(e) top and bottom walls;

(f) a channel wall outwardly proximate said front wall having a second pair of light-admitting apertures therethrough in optical registration with said first pair of light-admitting apertures wherein said channel wall and said front wall form a lateral filmstrip-receiving channel, said filmstrip holder comprising (g) a cover wall having a first lateral viewing slot therethrough;

(h) a base wall having a second lateral viewing slot therethrough in registration with said first viewing slot; and (i) a spacing wall disposed between said cover wall and said base wall having a lateral retaining slot therethrough overlying said viewing slots, said retaining slot and walls forming a pocket peripheral to said viewing slots; and a filmstrip comprising two lateral series of laterally spaced stereographic pairs of translucent framed images, said pairs being laterally spaced in registration with said first pair of light-admitting apertures, one series being transversely disposed with respect to the other, the images in each series being similarly transversely oriented and of substantially the same dimensions as said first pair of light-admitting apertures, said filmstrip being disposed within said retaining slot in said holder so that said framed images are substantially disposed within said viewing slots in said holder, said holder being adapted for laterally slidable insertion into and withdrawal from the said channel, and for substantially transversely aligning, alternatively, each of said series of framed images with the said first pair of light-admitting apertures when said holder is within said channel.

* * * * *